United States Patent
Foletti et al.

(10) Patent No.: US 7,743,526 B2
(45) Date of Patent: Jun. 29, 2010

(54) DEVICE FOR CHECKING COUNTERSINK DIMENSIONS

(75) Inventors: Sandro Foletti, Piacenza (IT); Maurizio Ferrari, Pizzighettone (IT); Roberto Muselli, Piacenza (IT)

(73) Assignee: JOBS S.p.A. (IT)

( * ) Notice: Subject to any disclaimer, the term of this patent is extended or adjusted under 35 U.S.C. 154(b) by 54 days.

(21) Appl. No.: 12/216,173

(22) Filed: Jun. 30, 2008

(65) Prior Publication Data
US 2009/0063091 A1    Mar. 5, 2009

(30) Foreign Application Priority Data
Jun. 29, 2007    (IT) .......................... BO2007A0451

(51) Int. Cl.
*G01B 3/28* (2006.01)
*G01B 5/18* (2006.01)
(52) U.S. Cl. .......................... 33/544.4; 33/503; 33/836; 33/558
(58) Field of Classification Search .................. 33/542, 33/544.1–544.4, 555.1, 556–561, 832, 833, 33/836, 503, 642
See application file for complete search history.

(56) References Cited

U.S. PATENT DOCUMENTS

| | | | |
|---|---|---|---|
| 3,116,560 A * | 1/1964 | Matthews | 33/534 |
| 3,940,854 A * | 3/1976 | Maxey | 33/503 |
| 4,168,576 A * | 9/1979 | McMurtry | 33/559 |
| 4,809,440 A * | 3/1989 | Rutter | 33/501.3 |
| 4,905,378 A | 3/1990 | Culver | |
| 5,475,932 A * | 12/1995 | Matsuhashi | 33/558 |
| 5,758,433 A * | 6/1998 | Alberts | 33/836 |
| 6,370,787 B1 | 4/2002 | Kikuchi | |
| 6,449,861 B1 * | 9/2002 | Danielli et al. | 33/556 |
| 2003/0217479 A1 | 11/2003 | Shen | |
| 2004/0151556 A1 * | 8/2004 | Ferrari et al. | 409/201 |
| 2005/0049126 A1 | 3/2005 | Everson | |
| 2005/0232714 A1 * | 10/2005 | Ferrari et al. | 408/97 |
| 2007/0101597 A1 | 5/2007 | Nappier | |

FOREIGN PATENT DOCUMENTS

| | | |
|---|---|---|
| DE | 40 27 637 AI | 3/1992 |
| DE | 199 32 446 AI | 2/2000 |
| EP | 1 442 837 A | 8/2004 |

* cited by examiner

*Primary Examiner*—Amy Cohen Johnson
(74) *Attorney, Agent, or Firm*—Timothy J. Klima; Shuttleworth & Ingersoll, PLC

(57) ABSTRACT

A device for checking countersink dimensions comprises a measuring head (2) associated with a spindle (3) of a multi-axis process machine (4), and a processing unit operatively associated with the spindle (3) to control spindle movements, the measuring head (2) comprising a contact element (5) that can be inserted into a countersink (101) and a comparator element (7) which, by coming into contact with the countersink and withdrawing, detects the stroke of the contact element (5) inside the countersink (101). A floating member (22) automatically corrects any alignment errors between the contact element (5) and the axis of the countersink (101).

17 Claims, 5 Drawing Sheets

DEVICE FOR CHECKING COUNTERSINK DIMENSIONS

BACKGROUND OF THE INVENTION

This invention relates to a device for checking the size of countersinks.

The invention applies in particular to dimensional checking for machining process certification of very large parts.

A typical application of the invention is dimensional checking of countersinks made by numerically controlled machines on large panels such as, for example, aircraft wing panels and fuselage parts.

An aircraft wing panel or a part of a fuselage requires several hundred or even thousands of countersinks to accommodate the heads of the rivets used to join the wing panel to the wing ribs or to fasten a fuselage panel to the fuselage frame.

These countersinks are usually made by numerically controlled machines where a suitable tool head machines the panel as required.

Certification of machined parts is becoming more and more a requirement as part machining and final assembly are performed by different companies.

Assembly houses require certification of every part they assemble to ensure that all prior machining processes have been performed to specifications and will not invalidate the final assembly.

At present, for certification to be obtained, it is sufficient to precisely measure only some of the countersinks made, the validity of the machining process in its entirety being determined a posteriori and only on a statistical basis.

Since machining tolerances, for example in aeronautical applications, are now required to be within 5 hundredths of a millimeter, the statistical certification process is no longer accepted and measurement of every single countersink is instead required.

In prior art, checking is carried out by one or more operators with gauge in hand to measure each single countersink.

This process, besides being very slow and therefore expensive, requires the provision of scaffolding and other equipment to allow access to the part of the panel where measurements are to be performed and to enable the operator to reach each countersink to be measured.

Moreover, checking the countersinks in the manner described above is subject to human error and to the fact that the gauges used, in order to provide a reliable reading, must be positioned on the countersink with extreme precision and meticulous care.

The Applicant has found that the instruments used for measuring the countersinks, and the measuring process itself, can be improved in several respects, especially in terms of measurement time and reliability.

SUMMARY OF THE INVENTION

In this situation, the basic purpose of the present invention is to provide a device for checking countersink dimensions capable of overcoming the above mentioned drawbacks.

In particular, this invention has for an aim to provide a device for checking countersink dimensions offering a high degree of precision and reliability.

Another aim of the invention is to provide a device for checking countersink dimensions that reduces the time required for checking the countersinks.

The technical purpose and aims specified are substantially achieved by a device for checking countersink dimensions comprising the technical characteristics described below in one or more of the appended claims.

BRIEF DESCRIPTION OF THE DRAWINGS

A preferred non-limiting embodiment of a device for checking the size of countersinks will now be described in further detail without restricting the scope of the inventive concept with reference to the accompanying drawings, in which.

DESCRIPTION OF THE PREFERRED EMBODIMENTS

With reference to the accompanying drawings, a device for checking countersink dimensions is denoted in its entirety by the numeral 1.

Figure 1:
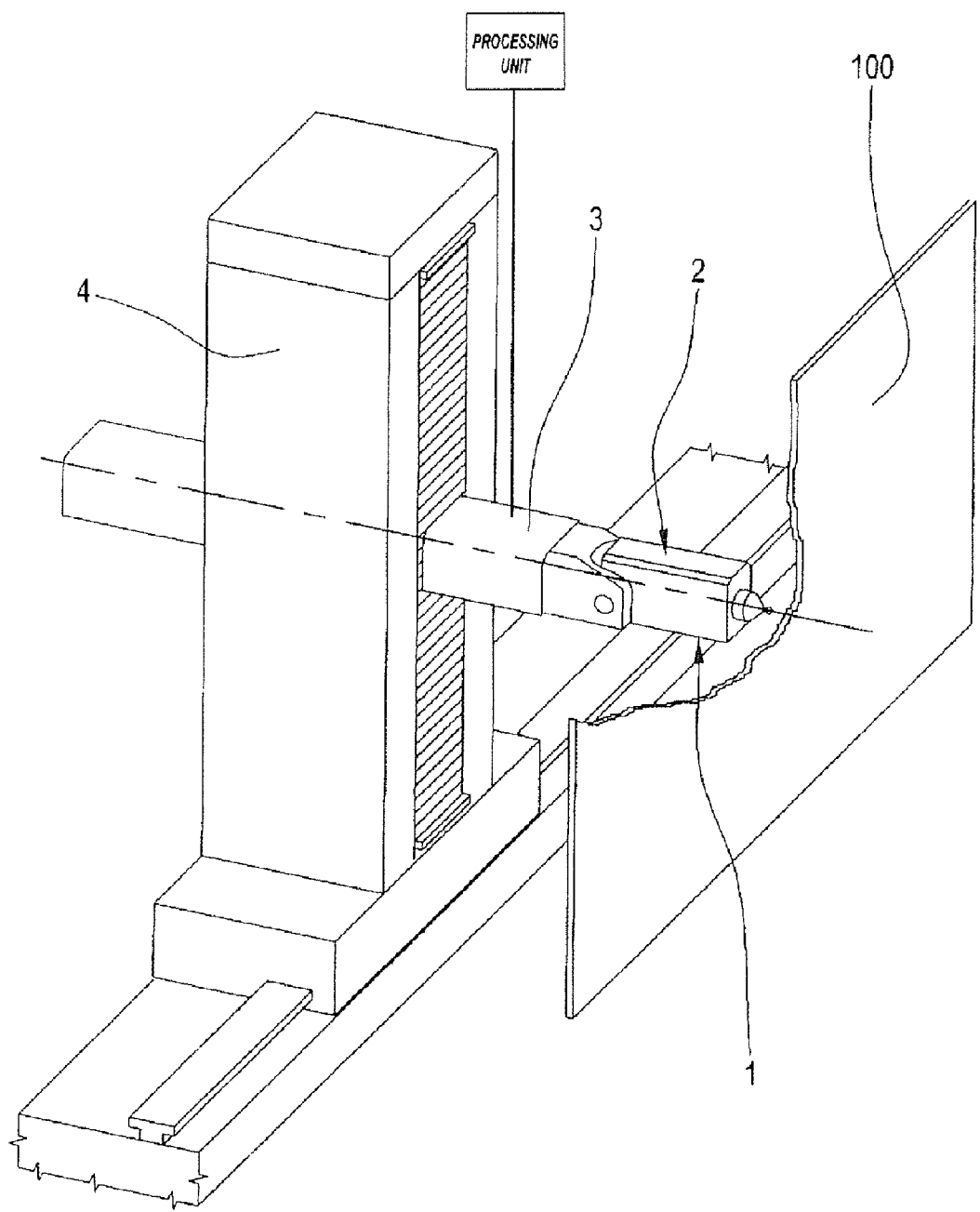
FIG. 1 is a side view of a device according to the invention for checking countersink dimensions.

The device 1 comprises a measuring head 2 associated with a spindle 3 of a multi-axis process machine 4 (shown in FIG. 1). The multi-axis process machine may be any numerically controlled machine of customary type. In the preferred embodiment, the multi-axis machine is the same machine that has made the countersinks whose dimensions are to be checked.

In the preferred embodiment, therefore, the multi-axis machine 4 comprises a magazine (not illustrated) containing a plurality of tools (not illustrated), such as, for example, a reamer, a plurality of cutters, a countersinking tool and the measuring head 2.

Depending on the machining process to be performed on the part (labeled 100 in FIG. 1 and represented as a thin panel) the multi-axis machine 4 loads the most suitable tool from the magazine. In the case of this invention, the multi-axis machine 4 loads the measuring head 2 from the magazine and automatically associates it with the spindle 3.

It should be stressed that in the context of this invention, measuring or checking a countersink means measuring the depth of the countersink, that is to say, the distance along an axis coinciding with the axis of symmetry of the countersink between the outside edge and the inside edge of the countersink.

The measuring head 2 comprises a contact element 5 that can be inserted at least partly in the countersink 101 to be measured.

In the example embodiment illustrated in the accompanying drawings, the contact element 5 comprises a punch 6 with a tip 6a having the shape of a pyramid with a circular base, that is to say, a conical shape. The tip 6a is the part of the contact element designed to be inserted into the countersink 101.

More specifically, the conical tip 6a of the contact element 5 has the same taper as the countersink 101 and is removably fastened, for example by screws, to the rest of the punch 6. Thus, to check countersinks with a different taper, the conical tip 6a can be changed with another one matching the taper of the countersink.

The device 1 also comprises a comparator element 7 designed to detect the extent to which the contact element 5 is inserted into the countersink 101, that is to say, to detect the depth reached by the punch 6 inside the countersink 101.

A processing unit (not illustrated) is operatively associated with the spindle 3 and controls spindle movements in such a way as to position the measuring head 2 at each of the countersinks 101 to be measured.

The processing unit controls the movements of the spindle 3 by acting on the spindle drive means (not illustrated) on the basis of a positioning program which, in the preferred embodiment, coincides with the positioning program used to drive the spindle 3 during countersinking operations.

In this way, the countersinks 101 can be measured without removing the panel in which the countersinks are made from the support used during countersinking operations, while at the same time being reasonably certain of the correct positioning of the measuring head 2 on the countersinks 101 to be measured.

The comparator element 7 comprises a first portion 8 that can be moved translationally along a sliding direction Y relative to the contact element 5. The sliding direction Y is substantially parallel to the axis of symmetry of the countersink 101.

In particular (see FIG. 4), the contact element 5 comprises an internal cylindrical cavity 9 that slidably receives the first portion 8 of the contact element 7 along the direction Y. The internal cavity 9, like the first portion 8 of the contact element 7, is substantially cylindrical and comprises an opening 10 to enable the mobile part 8 to be pushed out of the contact element 5 into contact with the edge of the countersink 101.

A second portion 11 of the comparator element 7 is integral with the contact element 5 and is acted upon by the first portion 8.

Figure 4:
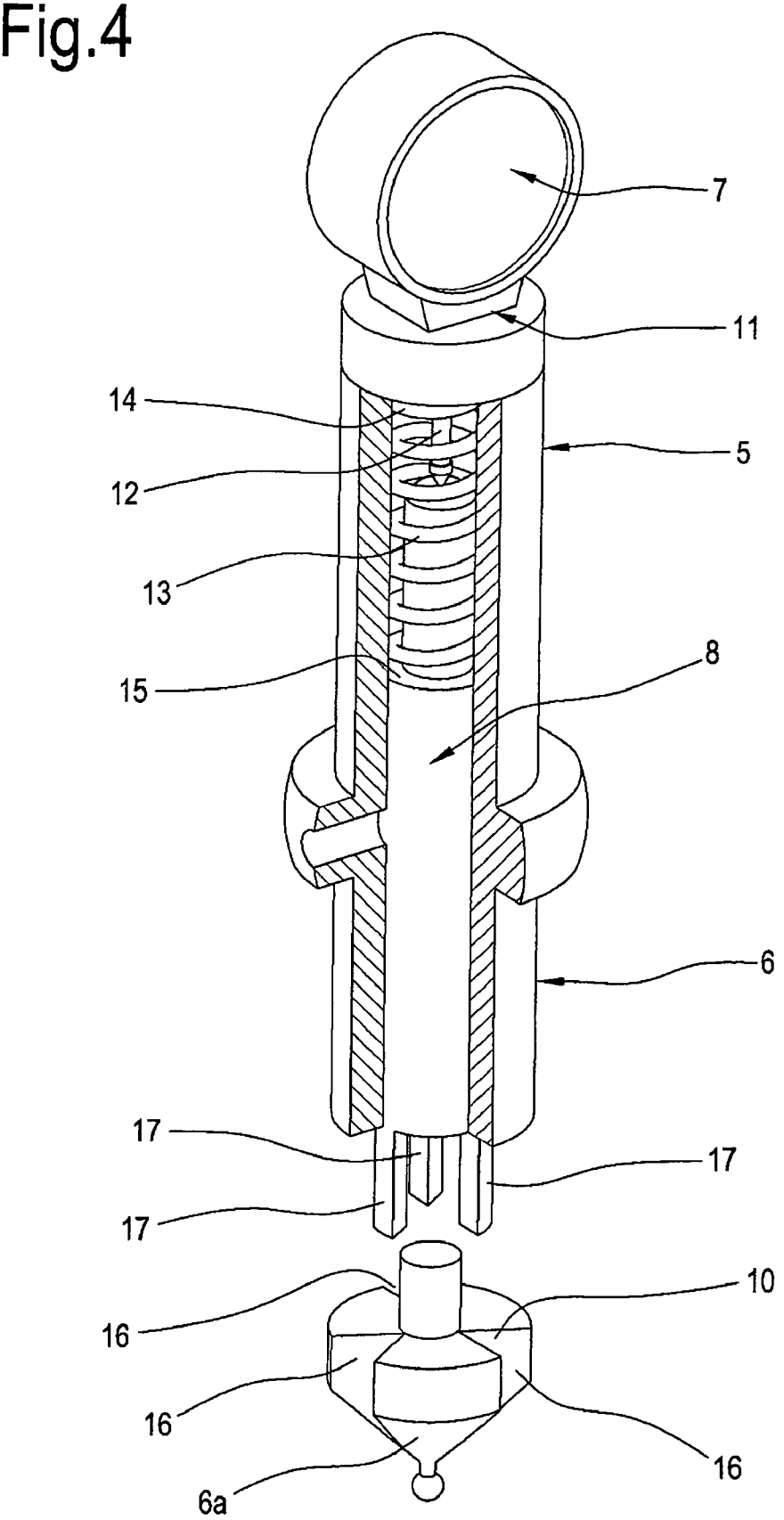
FIG. 4 is a perspective view, with some parts cut away, of a detail from FIGS. 2 and 3.

In particular, the second portion 11 is attached to the contact element 5 on the opposite side relative to the opening 10 and comprises a mobile end 12 that extends into the cavity 9 of the contact element 5 (see FIG. 4). The first portion 8 acts directly on the mobile end 12 of the second portion 11 of the comparator element 7. The movement of the mobile end 12 is therefore directly proportional to the sliding (withdrawal) of the first portion 8 relative to the contact element 5.

To avoid uncontrolled movements of the first portion 8 relative to the mobile end 12 of the second portion 11 of the comparator element 7, there is a spring 13 operating between an upper wall 14 of the cavity 9 and a shoulder 15 of the cylindrical element constituting the first portion 8 of the comparator element 7 (FIG. 4). The spring 13 pushes the first, mobile portion 8 constantly towards the opening 10.

As mentioned above, the first portion 8 moves, and more specifically, withdraws when the conical tip of the contact element 5 is inserted into the countersink 101.

Looking in more detail, the conical tip 6a has a plurality of slots 16 through which protrude an equal number of protuberances 17 of the first portion 8 of the comparator element 7.

These protuberances, or petals 17, extend towards the opening 10 and pass through the slots 16 in the conical tip 6a to abut the edge of the countersink 101.

In the preferred embodiment of the invention, there are three petals 17 at equal angular intervals of 120°, like the slots 16 in the conical tip 6a.

During insertion of the contact element 5 into the countersink 101, the petals 17 come into contact with the edge of the countersink and, as the conical tip 6a goes further into the countersink, the first portion 8 of the comparator element 7, that is to say, the portion on which the petals 17 are mounted, withdraws along the direction Y inside the cavity 9. The withdrawal movement and, more specifically, the extent of the withdrawal, is detected by the second portion 11 of the contact element 7 as a measure of the depth of the countersink 101.

The measuring head 2 also comprises activating means 18 for activating transmission of the countersink depth measurement to a remote station.

The remote station may be embodied, for example, by a computer for receiving the measurement readings of each countersink 101 and comparing them with predetermined design and tolerance values to determine whether or not the countersink measurement falls within certification requirements.

Advantageously, the signal transmission activation means 18 make it possible to send a single signal indicating the actual countersink 101 measurement (that is to say, the maximum extent to which the first, mobile portion 8 of the comparator element 7 withdraws) instead of a plurality of signals each indicating the gradually increasing extent to which the first portion 8 of the comparator element 7 withdraws.

Figure 2:
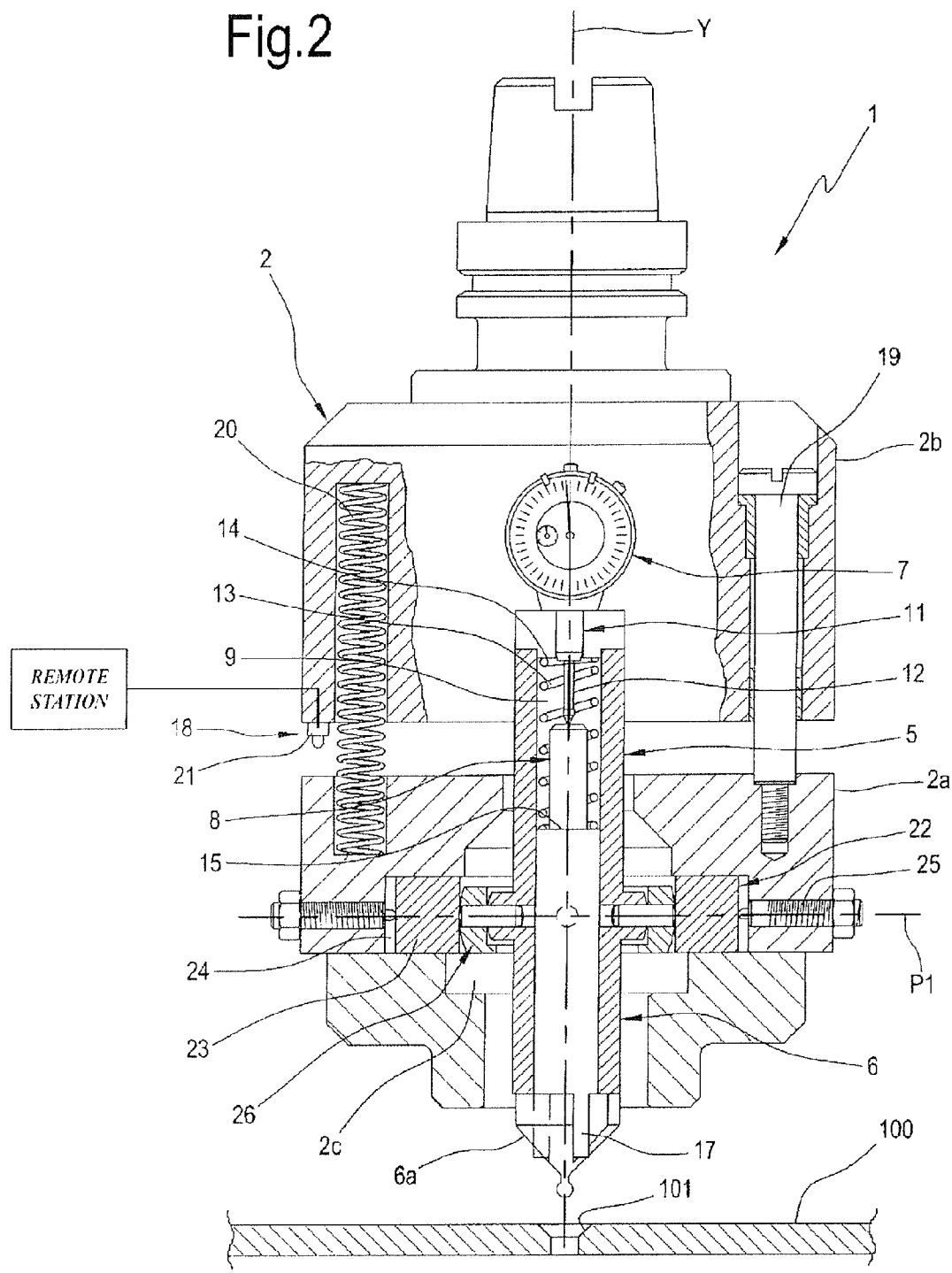
FIGS. 2 and 3 are section views of a detail from FIG. 1 in two different operating positions.
Figure 3:
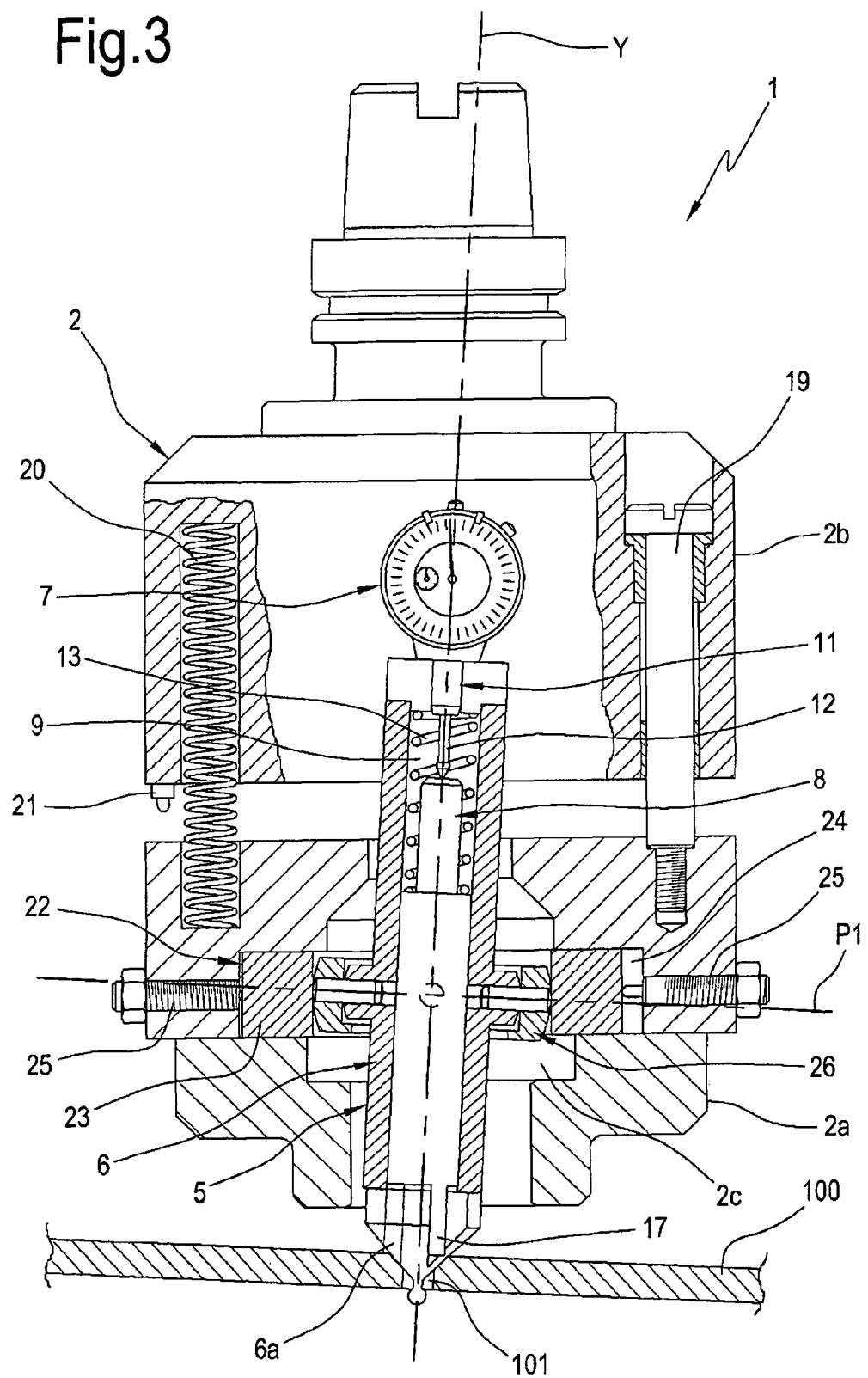

Operation of the activation means 18 contemplates the division of the measuring head 2 into two half parts 2a, 2b (FIGS. 2 and 3).

The contact element 5 and the comparator element 7 are adjustably mounted on the first half part 2a along the direction Y in such a way that they can slide relative to the second half part 2b of the measuring head 2, also along the direction Y.

The second half part 2b is attached to the first half part 2a in such a way as to have only one degree of freedom and, more specifically, in such a way that the two half parts 2a, 2b are connected to each other slidably along the direction Y.

The connection comprises one or more sliding guides 19 extending between the first and the second half part 2a and 2b (see FIGS. 2 and 3).

Between the first and the second half part 2a and 2b there extends also an elastic element 20 which, by yielding to the pushing action of the second half part towards the first half part, enables the two half parts 2a, 2b to move closer to each other.

In the preferred embodiment, the elastic element 20 comprises one or more springs extending parallel to the sliding guides 19.

A microswitch 21 is provided between the first and the second half part 2a and 2b to be activated when the two half parts 2a, 2b move close to each other.

It should be stressed that the microswitch 21 may be of any type, that is to say, mechanical, electrical, electromechanical, magnetic or optical.

In this way, when the first portion 8 of the contact element 7 is fully withdrawn, and measurement of the countersink 101 thus completed, pushing the measuring head 2 further towards the inside of the countersink 101 causes the elastic element 20 to yield in such a way that the two half parts 2a, 2b move closer together. This closing in movement activates the microswitch 21 to enable the measurement signal from the second portion 11 of the comparator element 7 to be transmitted.

Advantageously, the device 1 further comprises a floating member 22 operating between the contact element 5 and the spindle 3. The floating member 22 provides the connection between the spindle 3 and the contact element 5 with at least one, and preferably three, further degrees of freedom.

In particular, the floating member 22 operates between the outside surfaces of the punch 6 and the first half part 2a of the measuring head 2 (FIGS. 2 and 3).

The floating member 22 also provides at least one, and preferably three, further degrees of freedom for the connection between the spindle 3 and the comparator element 7, since the latter is partly integral with the punch 6 (second portion 11) and partly slidable along the direction Y relative to the inside of the punch (first portion 8).

Figure 5:
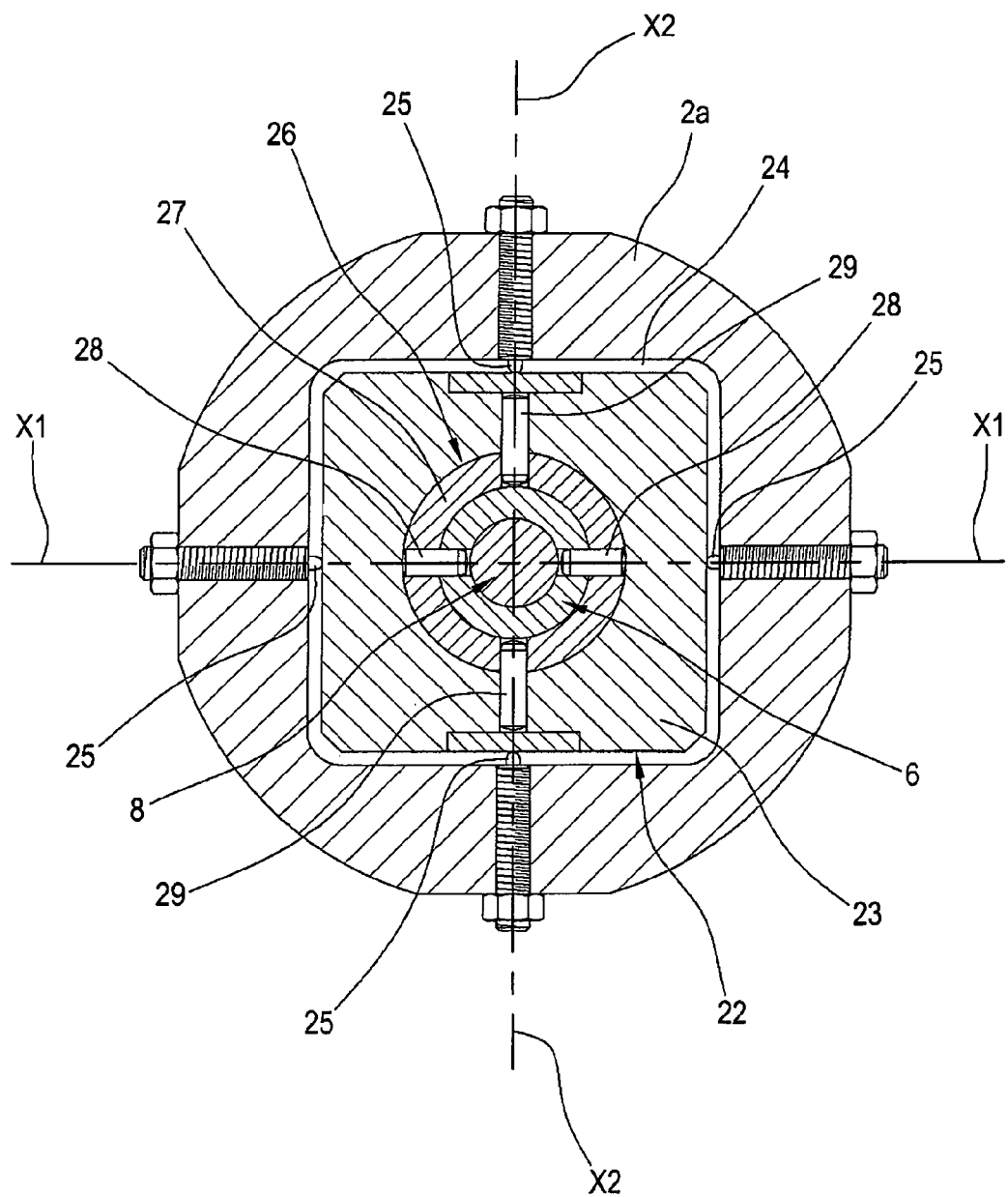
FIG. 5 is a section view through a plane perpendicular to the section plane of FIGS. 2 and 3 and illustrating the same detail as those two figures.

As shown in FIG. 5, the floating member 22 comprises a first component 23 connected to the contact element 5 and slidable in a plane P1 substantially perpendicular to the direction Y. The first component 23 comprises a ring with a polygonal shape, preferably quadrangular or hexagonal, seated in a recess 24 formed in the first half part 2a of the measuring head 2 and facing a cavity 2c of the first half part 2a in which the punch 6 is inserted. The recess 24 is shaped to match the ring 23 and therefore has flat walls.

A plurality of pushers 25, preferably spring-driven, operate in the recess 24 in the plane P1 to keep the ring 23 perfectly centered within the cavity 2c in the absence of external forces.

In this way, the punch 6 can move in the plane P1 relative to the first half part 2a and, hence, relative to the spindle 3, compensating for any alignment errors between the spindle 3 and the axis of the countersink 101.

The floating member 22 also comprises a second component 26 rotatably connected relative to the contact element 5 along a first axis X1 substantially perpendicular to the direction Y and rotatably connected to the spindle 3 along the first axis X1.

More specifically, the second component 26 comprises a ring 27 integral with two pins 28 spaced at 180° from each other and lying along the first axis X1. The two pins 28 are inserted in holes formed in the outside surface of the punch 6 in such a way that the ring 27, or rather, the punch 6, is rotatable about the first axis X1. The axis X1 is contained in the above mentioned plane P1.

The ring 27 of the second component 26 also comprises two additional pins 29 spaced at 180° from each other and at 90° from the pins 28.

The additional pins 29 are inserted in respective holes and operate between the ring 27 of the second component and the ring 23 constituting the first component.

Thus, the second component 26 can rotate about a second axis X2, perpendicular to the first axis X1 and also contained in the plane P1.

Advantageously, therefore, the contact element 5 and the comparator element 7 can rotate about two axes X1, X2 relative to the first half part 2a of the measuring head 2 and, hence, relative to the spindle 3, compensating for any alignment errors during positioning of the contact element 5 on the countersink 101.

It should be noticed—see FIGS. 2 and 3—that the points of contact between the first component 23 and the second component 26 and between the punch 6 and the second component 26 define circles, and thus lines and surfaces.

In fact, the surface of the punch that is in contact with the second component 26 is rounded, while the surface of the second component that is contact with the punch 6 is flat.

Similarly, where the first component 23 and the second component 26 are in contact with each other, the former has a rounded surface and the latter a flat vertical surface.

In use, the spindle 3 moves the measuring head 2 close to the countersink to be measured and, more specifically, moves the conical tip 6a of the punch 6 close to the mouth of the countersink 101 (FIG. 2).

Next, the conical tip 6a starts going into the countersink 101 and the petals 17 of the first portion 8 of the comparator element 7 come into contact with the edge of the countersink 101. The first portion 8 thus starts to withdraw along the direction Y under the action of the pushing force exerted by the spindle 3.

This withdrawal causes withdrawal to the same extent of the mobile end 12 of the second portion 11 of the comparator element 7 which thus determines the measurement (still partial) of the depth of the countersink 101.

When the conical tip 6a is in full contact with the tapered wall of the countersink 101, the extent to which the petals 17 have withdrawn, measured by the mobile portion 12 of the second portion 11 of the comparator element 7, determines the depth of the countersink 101.

At this point, the further pushing force applied to the measuring head 2 towards the inside of the countersink 101 causes the elastic element 20 to yield in such a way that the two half parts 2a, 2b of the measuring head 2 move closer together.

This closing in movement activates the microswitch 21 which enables the measurement signal to be transmitted to the remote station.

It should be noticed that each measuring cycle is preceded by the measurement of a master countersink whose depth is known exactly so as to precisely calibrate the measuring head 2.

If the axis of the countersink 101 and the axis of the punch 6 are not perfectly aligned and, at the same time, the two axes are offset from each other, the conical tip 6a of the punch 6 is not aligned with the countersink 101.

These alignment errors are corrected by the floating member 22.

Indeed, under conditions of misalignment, the freedom of the punch 6 to move rotationally about the two axes X1 and X2 belonging to the same plane P1, and the freedom of the punch 6 to move translationally in the plane P1 relative to the spindle 3 enables the punch 6 to realign exactly with the countersink and to perform a correct measurement.

In particular, the reaction force exerted by the part of the countersink on which the conical tip 6a of the punch 6 discharges the force transmitted by the spindle has components directed both in the Y direction and in a direction perpendicular to the Y direction, that is to say, in the plane P1.

This reaction force is discharged on the floating member 22, and, more specifically, on its mobile parts.

Since the mobile parts of the floating member 22 yield under the action of the forces directed in the plane P1 (whereas they can resist the forces directed along the Y direction), they move and, consequently, cause the punch 6 to move until the constraining reaction transmitted has components only along the direction Y.

At this point, the punch 6, and with it the contact element 5 and the comparator element 7, is perfectly aligned with the axis of the countersink and measurement can be performed correctly (FIG. 3).

In other words, the conical tip 6a of the punch 6, by entering the countersink 101, causes the punch 6 to move rotationally and translationally along a direction perpendicular to the direction Y until the conical wall of the tip 6a makes snug contact with the conical wall of the countersink 101, guaranteeing the perfect alignment of the countersink axis with the axis of the comparator and contact elements 7 and 5 even if initially misaligned (FIG. 3).

The invention achieves the proposed aims.

Indeed, the device 1 for checking countersink dimensions achieves a high level of precision and reliability, since correct measurement does not depend on the operator's skill but, on the contrary, is performed in a fully automatic and perfectly repeatable manner.

Moreover, it should be stressed that the floating member makes it possible to correct positioning errors of the measuring head relative to the axis of the countersink.

Further, the device 1 for checking countersink dimensions significantly reduces countersink checking times since the measuring procedure is fully automated and there is no need to move the panel in which the countersinks are made or to erect scaffolding to gain access to the countersinks.

It should also stressed that the means that activate transmission of the measurement signal minimize the time required to take the measurement.

What is claimed is:

1. A device for checking countersink dimensions comprising: a measuring head associated with a spindle of a multi-axis process machine; and a processing unit operatively associated with the spindle to control spindle movements; the measuring head comprising a contact element that can be inserted at least partly into a countersink and a comparator element for detecting an extent to which the contact element is inserted into the countersink;
    wherein the comparator element comprises a first portion slidably connected to the contact element along a sliding direction substantially parallel to an axis of the countersink; the first portion being designed to abut an edge of the countersink and to withdraw during insertion of the contact element;
    wherein the comparator element comprises a second portion integral with the contact element and having an end that moves into contact with the first portion to detect an extent to which the first portion withdraws; and
    wherein the first portion of the comparator element comprises a hollow first cylinder constituting a portion of the contact element and a second cylinder that slidingly fits into the hollow first cylinder; the second cylinder comprising three petals protruding from the hollow first cylinder for contacting the edge of the countersink.

2. The device according to claim 1, further comprising a floating member operating between the contact element and the spindle to provide a connection between the spindle and the contact element with at least two degrees of freedom.

3. The device according to claim 2, wherein the floating member also operates between the comparator element and the spindle to provide a connection between the spindle and the comparator element with at least two degrees of freedom.

4. The device according to claim 2, wherein the floating member comprises a first component connected to the contact element along a plane substantially perpendicular to a sliding direction of the comparator element and slidable relative to the spindle in the first plane.

5. The device according to claim 4, wherein the floating member comprises a second component connected relative to the contact element rotatably about a first axis substantially perpendicular to the sliding direction of the comparator element and connected to the spindle rotatably about the first axis.

6. The device according to claim 5, wherein the first axis is contained in the plane and in that the second component is rotatably connected to the first component along a second axis perpendicular to the first axis and contained in the plane.

7. The device according to claim 1, wherein the measuring head comprises a first half part and a second half part slidable relative to the first half part along the sliding direction of the comparator element; and an activator located between the two half parts for activating transmission of the measurement from the comparator element to a remote station, the activator being activated when the two half parts move close together.

8. A device for checking countersink dimensions comprising: a measuring head associated with a spindle of a multi-axis process machine; and a processing unit operatively associated with the spindle to control spindle movements; the measuring head comprising a contact element that can be inserted at least partly into a countersink and a comparator element for detecting an extent to which the contact element is inserted into the countersink;
    wherein the comparator element comprises a first portion slidably connected to the contact element along a sliding direction substantially parallel to an axis of the countersink; the first portion being designed to abut an edge of the countersink and to withdraw during insertion of the contact element;
    wherein the comparator element comprises a second portion integral with the contact element and having an end that moves into contact with the first portion to detect an extent to which the first portion withdraws; and
    wherein the first portion of the comparator element comprises a hollow first cylinder constituting a portion of the contact element and a second cylinder that slidingly fits into the hollow first cylinder; the second cylinder comprising a plurality of petals protruding from the hollow first cylinder for contacting the edge of the countersink.

9. The device according to claim 8, further comprising a floating member operating between the contact element and the spindle to provide a connection between the spindle and the contact element with at least two degrees of freedom.

10. The device according to claim 9, wherein the floating member also operates between the comparator element and the spindle to provide a connection between the spindle and the comparator element with at least two degrees of freedom.

11. The device according to claim 10, wherein the floating member comprises a first component connected to the contact element along a plane substantially perpendicular to a sliding direction of the comparator element and slidable relative to the spindle in the first plane.

12. The device according to claim 11, wherein the floating member comprises a second component connected relative to the contact element rotatably about a first axis substantially perpendicular to the sliding direction of the comparator element and connected to the spindle rotatably about the first axis.

13. The device according to claim 12, wherein the first axis is contained in the plane and in that the second component is rotatably connected to the first component along a second axis perpendicular to the first axis and contained in the plane.

14. The device according to claim 9, wherein the floating member comprises a first component connected to the contact element along a plane substantially perpendicular to a sliding direction of the comparator element and slidable relative to the spindle in the first plane.

15. The device according to claim 14, wherein the floating member comprises a second component connected relative to the contact element rotatably about a first axis substantially perpendicular to the sliding direction of the comparator element and connected to the spindle rotatably about the first axis.

16. The device according to claim 15, wherein the first axis is contained in the plane and in that the second component is rotatably connected to the first component along a second axis perpendicular to the first axis and contained in the plane.

17. The device according to claim 8, wherein the measuring head comprises a first half part and a second half part slidable relative to the first half part along the sliding direction of the comparator element; and an activator located between the two half parts for activating transmission of the measurement from the comparator element to a remote station, the activator being activated when the two half parts move close together.

* * * * *